United States Patent [19]
Tucker et al.

[11] 3,925,921
[45] Dec. 16, 1975

[54] FISHING SINKER

[76] Inventors: John L. Tucker; George Spector, both of 3615 Woolworth Bldg., 233 Broadway, New York, N.Y. 10007

[22] Filed: Sept. 5, 1974

[21] Appl. No.: 503,343

[52] U.S. Cl. .......... 43/43.12; 24/115 F; 24/201 TR; 43/44.97
[51] Int. Cl.² ......................................... A01K 95/00
[58] Field of Search ............... 43/43.12, 44.97, 43.1; 24/115 F, 201 TR

[56] References Cited
UNITED STATES PATENTS

| | | | |
|---|---|---|---|
| 883,048 | 3/1908 | Pflueger | 43/43.1 |
| 2,713,743 | 7/1955 | Stark | 43/43.12 |
| 3,195,262 | 7/1965 | Metzler | 43/43.12 |
| 3,218,751 | 11/1965 | Walker | 43/43.12 X |
| 3,541,720 | 11/1970 | Buffet | 43/43.12 X |
| 3,744,177 | 7/1973 | Cron, Jr. | 43/43.12 |

*Primary Examiner*—Robert Peshock
*Assistant Examiner*—Daniel J. Leach

[57] ABSTRACT

An improved fishing line sinker for sports fishermen, the sinker being designed to break loose from the fishing line in case it becomes caught among underwater rocks, logs or other debris, thus allowing the rest of the tackle to be pulled in instead of being lost; the sinker consisting of a weakened portion to which the line is attached and which readily breaks off under a pulling stress.

4 Claims, 7 Drawing Figures

U.S. Patent  Dec. 16, 1975  3,925,921
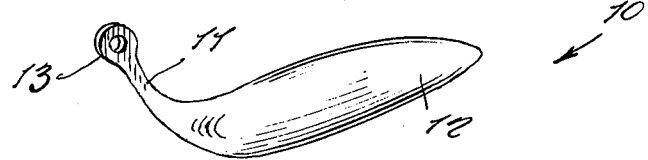
Fig. 1
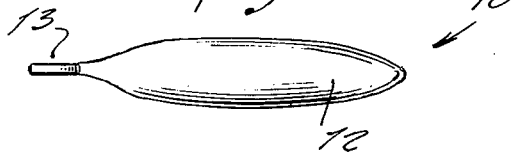
Fig. 2
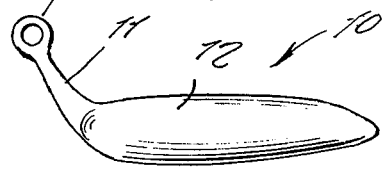
Fig. 3
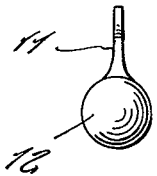
Fig. 4
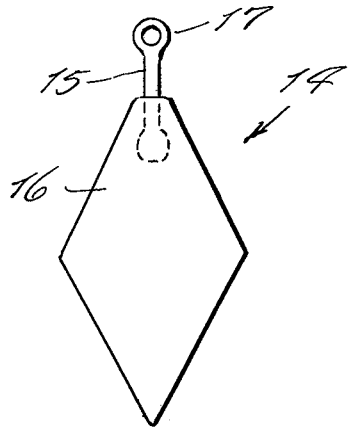
Fig. 5
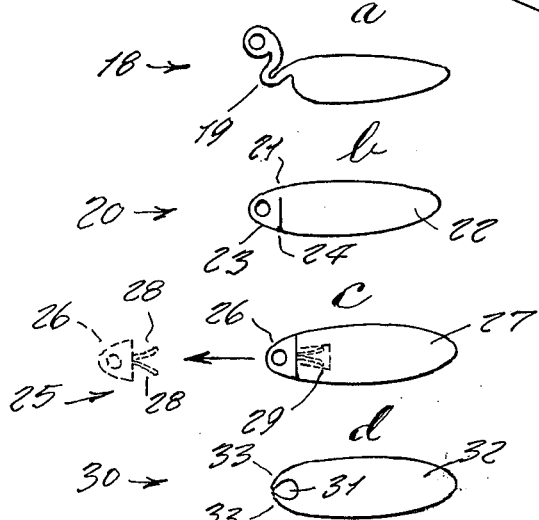
Fig. 6
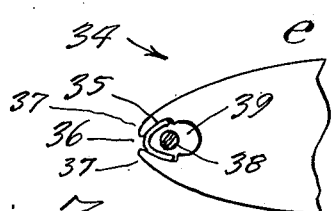
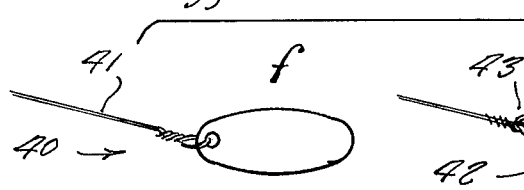
Fig. 7
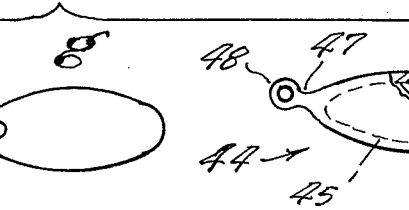

FISHING SINKER

This invention relates generally to sinkers for use on fishing lines.

It is generally well known that a great many sports fishermen loose a part of their fishing tackle when a sinker becomes ledged or hooked up behind rocks, logs or other debris, underwater so that when line is forcibly pulled, it breaks and all the underwater tackle is lost. This situation is objectionable and is, therefore, in want of an improvement.

Accordingly, it is a principle object of the present invention to provide an improved sinker which breaks off from the line when it is forcibly pulled, thus permitting all the rest of the tackle to be retrieved.

Another object is to provide an improved fishing sinker which accordingly eliminates broken off fishing line floating in the water where it can become a hazard for a swimmer to become entangled therein, so that his swimming is dangerously impaired.

Still another object is to provide an improved fishing sinker which thus prevents contamination of water with fishing lines, and hooks as well that are dangerous if stepped upon.

Other objects are to provide an improved fishing sinker which is simple in design, inexpensive to manufacture, rugged in construction, easy to use and efficient in operation.

These and other objects will be readily evident upon a study of the following specification and the accompanying drawing wherein:

FIG. 1 is a perspective view of one design of the invention.

FIG. 2 is a top view thereof.

FIG. 3 is a side view.

FIG. 4 is an end view.

FIG. 5 is a side view of a deep water design model of the invention.

FIG. 6 shows side views of further modified designs of the invention and showing at (a) a model in which the neck is U-shaped so that under a stress pull it will more positively break; (b) showing a similar feature which, however, is streamlined so as not to snag so easily; (c) showing a model in which the eyelet snaps off the weight under excessive pulling stress so to loosen the weight; (d) showing a design in which the eyelet tapers toward a thin opening so that upon stress the thin end breaks off and allows the fishing line to slip out; and (e) showing a variation of (d) in which a thin leaf spring blocks the thin opening so to normally retain the line, but wherein under pulling stress, the line pushes the leaf spring out the opening and the line than also slips out thereof.

FIG. 7 is a side view of further modified designs of the invention wherein there is shown at (f) a sinker attached to a brittle, breakable wire or line, at (g) a sinker being attached to a soft wire eyelet that can open up, and at (h) a sinker with a break-off plastic neck.

Referring now to the drawing in detail, the reference numeral 10 represents in FIGS. 1 to 4 a sinker that is molded of plastic or metal so that it will sink in water and which includes a narrow neck 11 between a body 12 and an eyelet 13, so that when forcibly tugged, the neck will break off, thus freeing the fishing tackle from the sinker body when snagged on underwater obstacles. The neck extends at an angle to the longitudinal axis of the body for break-off purposes.

In FIG. 5, a deep water sinker 14, likewise, includes a narrow break-off neck 15 between a body 16 and eyelet 17.

In FIG. 6, at (a), the sinker 18 includes a neck 19 that is S-shaped so that regardless from which direction it is pulled, the pulling stress is transverse across some portion of the neck, thus causing it to break off readily.

At (b), the sinker 20 has a weakened portion 21 between body 22 and eyelet 23 so that portion 21 breaks under heavy pull; the eyelet and body have thin slit 24 therebetween, and the eyelet and body together have a streamlined contour that prevents the sinker becoming snagged on underwater objects.

At (c), the sinker 25 includes the same streamline as the sinker 20, but the eyelet 26 snaps off from body 27 instead of breaking off, due to spreadable spring legs 28 of the eyelet being normally held within outwardly tapered opening 29 of the body.

At (d), the sinker 30 likewise is streamlined so as not to readily snag, and includes an eyelet opening 31 formed within one end of the body 32 by means of tapering tips 33 being curved to meet each other so that normally the opening 31 is held on a line, but under a stres pull, the tips spread apart so to allow the line to snap out of the opening.

At (e) the sinker 34 is the same as sinker 30 except that a thin leaf spring 35 blocks a thin space 36 formed between tips 37. A pulling stress on line 38 in opening 39 causes the line to push the spring 35 out of the opening; the spring at such time wrapping around the line so to prevent damage to the line as it passes between the tips.

In FIG. 7 at (f), a sinker 40 is retained on a brittle wire 41 that readily breaks under excessive pulling stress.

At (g), the sinker 42 is connected to a soft wire ring 43 that readily opens up under pulling stress.

At (h), the sinker 44 consists of metal body 45 encased within a plastic shell 46 that is integral with a thin plastic neck 47 which readily breaks under excessive pulling stress on eyelet 48 formed on the neck end.

Thus various forms of the invention have been indicated, and all of which accomplish the intended useful purpose.

The sinkers can be made in bright colors so to be easily visible for the selection of a predetermined pound test breakage within variables.

The sinkers may incorporate shapes that resist excessive rolling and twisting.

While various changes may be made in the detail construction, it is understood that such changes will be within the spirit and scope of the present invention as is defined by the appended claims.

What is claimed is:

1. In an improved fishing sinker, the combination of a sinker body made of suitable material so as to sink in water, an eylet opening on said sinker for a fishing line to be attached therein, and means whereby said fishing line is freed from said sinker body in case said sinker body becomes snagged behind an underwater obstacle, wherein said means comprises a weakened, thin neck between said body and an eyelet portion having said opening.

2. The combination as set forth in claim 1 wherein said neck is at an angle respective to a longitudinal axis of said body.

3. The combination as set forth in claim 1 wherein said neck is S-shaped.

4. The combination as set forth in claim 1 wherein said means comprises said body being made of metal and encased in a plastic shell, said shell incorporating said weakened neck.

* * * * *